(12) United States Patent
Matsushita et al.

(10) Patent No.: US 10,653,961 B2
(45) Date of Patent: May 19, 2020

(54) SYSTEMS AND METHODS OF CONTROLLING GAME CHARACTER ATTRIBUTES

(71) Applicant: NINTENDO CO., LTD., Kyoto (JP)

(72) Inventors: Shingo Matsushita, Kyoto (JP); Kouhei Maeda, Kyoto (JP); Yuji Ohashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 48 days.

(21) Appl. No.: 16/054,141

(22) Filed: Aug. 3, 2018

(65) Prior Publication Data
US 2019/0160379 A1 May 30, 2019

(30) Foreign Application Priority Data

Nov. 24, 2017 (JP) ................................ 2017-225863

(51) Int. Cl.
| | | |
|---|---|---|
| *A63F 13/58* | (2014.01) | |
| *A63F 13/533* | (2014.01) | |
| *A63F 13/822* | (2014.01) | |
| *A63F 13/5375* | (2014.01) | |

(52) U.S. Cl.
CPC ............ *A63F 13/58* (2014.09); *A63F 13/533* (2014.09); *A63F 13/5375* (2014.09); *A63F 13/822* (2014.09); *A63F 2300/305* (2013.01); *A63F 2300/65* (2013.01); *A63F 2300/807* (2013.01)

(58) Field of Classification Search
None
See application file for complete search history.

(56) References Cited

U.S. PATENT DOCUMENTS

| | | | |
|---|---|---|---|
| 2012/0015746 A1* | 1/2012 | Mooney | A63F 13/795 463/42 |
| 2014/0349765 A1* | 11/2014 | Namgoong | G07F 17/3225 463/42 |
| 2015/0238862 A1 | 8/2015 | Suzuki | |
| 2017/0106278 A1* | 4/2017 | Ishizawa | A63F 13/537 |
| 2017/0243435 A1* | 8/2017 | Morishita | G07F 17/3225 |
| 2018/0304158 A1 | 10/2018 | Miyamae et al. | |

FOREIGN PATENT DOCUMENTS

| | | |
|---|---|---|
| JP | 2015-157002 | 9/2015 |
| JP | 2016-168349 | 9/2016 |
| JP | 6184634 | 8/2017 |

OTHER PUBLICATIONS

Satoshi Kajiwara, Nintendo Official Guide Book "Fire Emblem Mystery of the Emblem 'Professional'", first edition Fire Emblem Professional, Shogakukan Inc., Apr. 20, 1995, first edition, pp. 70 (4 pages).
Notice of Reasons for Refusal dated Apr. 1, 2019 issued in JP 2017-225863 (5 pages) and its machine translation (9 pages).

* cited by examiner

*Primary Examiner* — Jason T Yen
(74) *Attorney, Agent, or Firm* — Nixon & Vanderhye P.C.

(57) ABSTRACT

An information processing method includes selecting at least one character from a plurality of characters possessed by a user according to the user's operation, adding an attribute related to an additional character to the selected character, causing one or more of the plurality of characters possessed by the user to appear in a game, and executing the game, and if the characters appearing in the game include the additional character and the selected character having the added attribute, changing a setting in the game such that an advantage is given to the user.

19 Claims, 7 Drawing Sheets

ATTRIBUTE: WATER   COMPANION'S HP +3, SPEED +3

DURING THE SEASON "WATER,"
IF A COMPANION HAVING A GIVEN GIFT ITEM
INDICATING "WATER" MAKES A MISSION ALONG
WITH A GIVER CHARACTER HAVING THE ATTRIBUTE
"WATER,"
THE EFFECT IS GIVEN TO THE COMPANION.

SYSTEMS AND METHODS OF CONTROLLING GAME CHARACTER ATTRIBUTES

CROSS REFERENCE TO RELATED APPLICATION

The disclosure of Japanese Patent Application No. 2017-225863, filed Nov. 24, 2017, is incorporated herein by reference.

FIELD

The technology disclosed herein relates to information processing systems and information processing methods, and more particularly, to information processing systems and information processing methods for performing a game process, for example.

BACKGROUND AND SUMMARY

There has conventionally been a game program that processes a game in which a plurality of characters appear.

In the game in which a plurality of characters appear, that is executed by such a game program, the characters appearing in the game are typically predetermined or fixed, and therefore, the game typically has fixed strategies. There is room for improvement in terms of strategies available to a user.

With this in mind, it is an object of a non-limiting example embodiment to provide an information processing system and information processing method that can increase strategies available to a user in a game in which a plurality of characters appear.

To achieve the above, this non-limiting example embodiment has the following features, for example. It should be understood that the scope of the present technology is defined only by the appended claims. To the extent of any inconsistency or conflict in disclosure between the description and the claims appended hereto, the claims shall prevail.

A non-limiting example of the information processing system of the non-limiting example embodiment includes at least one computer. The at least one computer executes: selecting at least one character from a plurality of characters possessed by a user according to the user's operation; adding an attribute related to an additional character to the selected character; causing one or more of the plurality of characters possessed by the user to appear in a virtual space, and executing a game; and if the characters appearing in the virtual space include the additional character and the selected character having the added attribute, changing a parameter of the selected character having the added attribute such that an advantage is given to the user, and the parameter is used in a process for the game.

With the above feature, if the characters appearing in the game include the additional character and the selected character having the added attribute, a parameter of the selected character having the added attribute is changed such that an advantage is given to the user. Therefore, a strategy may be devised in terms of determination of whether or not the additional character and the selected character having the added attribute are to be included into the characters appearing in the game. In addition, the selected character can be selected from the plurality of characters possessed by the user itself. Therefore, the user can take a more variety of strategies.

The at least one computer of the information processing system may further execute setting one or more of the plurality of characters possessed by the user, as an appearance group, to appear in the virtual space, according to the user's operation. In this case, the changing the parameter may include changing the parameter of the selected character having the added attribute such that an advantage is given to the user if the characters set as the appearance group include the additional character and the selected character having the added attribute.

With the above feature, a strategy may be devised in terms of determination of whether or not a group of the additional character and the selected character having the added attribute the parameter of which is to be changed such that an advantage is given to the user is to be included into the appearance group set by the user.

The adding the attribute may include adding the attribute to the selected character by giving an item related to the attribute to the selected character, and allowing the item given to the selected character to be used only by the selected character.

With the above feature, a strategy can be enhanced by placing greater importance on determination of which character is to be selected and which attribute is to be related to that character.

The changing the parameter may include changing an ability setting in the game of the selected character having the added attribute such that an advantage is given to the user if the characters appearing in the virtual space include at least one of the additional characters and the selected character having the added attribute, and the attribute added to the selected character having the added attribute corresponds to an attribute related to the additional character.

With the above feature, if the characters appearing in the game include the additional character and the selected character having the added attribute, an ability setting of the selected character having the added attribute is changed such that an advantage is given to the user. Therefore, a strategy may be devised in terms of determination of whether or not the additional character and the selected character having the added attribute are to be included into the characters appearing in the game. In addition, the selected character can be selected from the plurality of characters possessed by the user itself. Therefore, the user can take a more variety of strategies.

Another non-limiting example of the information processing system of the non-limiting example embodiment includes at least one computer. The at least one computer executes: selecting at least one character from a plurality of characters possessed by a user according to the user's operation; adding an attribute related to an additional character to the selected character; causing one or more of the plurality of characters possessed by the user to appear in a game, and executing the game; and if the characters appearing in the game include the additional character and the selected character having the added attribute, changing a setting in the game such that an advantage is given to the user.

With the above feature, if the characters appearing in the game include the additional character and the selected character having the added attribute, a setting in the game is changed such that an advantage is given to the user. Therefore, a strategy may be devised in terms of determination of whether or not the additional character and the selected character having the added attribute are to be included into the characters appearing in the game. In addition, the selected character can be selected from the plurality of characters possessed by the user itself. Therefore, the user can take a more variety of strategies.

The at least one computer may further execute setting one or more of the plurality of characters possessed by the user, as an appearance group, to appear in the virtual space, according to the user's operation. In this case, the changing the setting in the game may include changing the setting in the game such that an advantage is given to the user if the characters set as the appearance group include the additional character and the selected character having the added attribute.

With the above feature, a strategy may be devised in terms of determination of whether or not a group of the additional character and the selected character having the added attribute for which a setting in the game is to be changed such that an advantage is given to the user is to be included into the appearance group set by the user.

The adding the attribute may include adding at least one selected from at least two categories, as the attribute, to the selected character according to the user's operation. The changing the setting in the game may include changing the setting in the game such that an advantage is given to the user if the at least one category indicated by the attribute added to the selected character appearing in the game is the same as at least one category corresponding to an attribute related to the additional character appearing in the game.

With the above feature, if the at least one category indicated by the attribute added to the selected character is the same as at least one category corresponding to an attribute related to the additional character, a setting in the game is changed such that an advantage is given to the user. The user can determine which character is to be selected and what category is to be related to that character, and therefore, a strategy can be further enhanced.

The at least one computer of the information processing system may further execute setting at least one period of time. In this case, the changing the setting in the game may include changing the setting in the game such that an advantage is given to the user if a current time is within the at least one period of time, and the characters appearing in the game include the additional character and the selected character having the added attribute.

With the above feature, a strategy may be devised in terms of determination of which character is to be caused to appear in the game, depending on whether or not a current time in the game is within a predetermined period of time. Therefore, a strategy can be enhanced.

The setting the at least one period of time may include assigning an attribute related to the additional character to the at least one period of time. The changing the setting in the game may include changing the setting in the game such that an advantage is given to the user if the characters appearing in the game include the additional character and the selected character having the added attribute, and the attribute assigned to the at least one period of time including the current time in the setting the at least one period of time, the attribute added to the selected character having the added attribute, and an attribute related the additional character are all related to each other.

With the above feature, a strategy may be devised in terms of determination of which character is to be caused to appear in the game, depending on the attribute assigned to the at least one period of time including the current time in the game.

The setting the at least one period of time may include assigning at least one category corresponding to an attribute related to the additional character to the at least one period of time. The changing the setting in the game may include changing the setting in the game such that an advantage is given to the user if the characters appearing in the game include at least one of the additional characters and the selected character having the added attribute, and the at least one category assigned to the at least one period of time including the current time in the setting the at least one period of time, a category indicated by the attribute added to the selected character having the added attribute, and the at least one category corresponding to an attribute related the additional character are the same.

With the above feature, a strategy can be enhanced in terms of determination of which category is to be selected for a character which is to be caused to appear in the game, depending on the category corresponding to the attribute assigned to the at least one period of time including the current time in the game.

The adding the attribute may include adding the attribute to the selected character by giving an item related to the attribute to the selected character, and allowing the item given to the selected character to be used only by the selected character.

With the above feature, a strategy can be enhanced by placing greater importance on determination of which character is to be selected and which attribute is to be related to that character.

The at least one computer of the information processing system may further execute: adding the additional character to the plurality of characters possessed by the user; and if the additional character is added, adding an item related to the attribute related to the additional character as an item possessed by the user. In this case, the adding the attribute may include adding the attribute to the selected character by giving an item related to the attribute to the selected character.

With the above feature, an additional character can be strategically used immediately after the additional character is added.

The changing the setting in the game may include changing an ability setting in the game of the selected character having the added attribute such that an advantage is given to the user if the characters appearing in the game include at least one of the additional characters and the selected character having the added attribute, and the attribute added to the selected character having the added attribute corresponds to an attribute related to the additional character.

With the above feature, if the characters appearing in the game include the additional character and the selected character having the added attribute, a setting in the game is changed such that an advantage is given to the user. Therefore, a strategy may be devised in terms of determination of whether or not the additional character and the selected character having the added attribute are to be included into the characters appearing in the game. In addition, the selected character can be selected from the plurality of characters possessed by the user itself. Therefore, the user can take a more variety of strategies.

The changing the setting in the game may include changing the parameter in the game of one or more of the selected character or characters having the added attribute so as to change an ability setting of the selected character having the added attribute such that an advantage is given to the user if the characters appearing in the game include at least one of the additional characters and the selected character having the added attribute, and the attribute added to the selected character having the added attribute corresponds to an attribute related to the additional character.

With the above feature, if the characters appearing in the game include the additional character and the selected character having the added attribute, the parameter of the selected character is changed so as to change a setting in the game such that an advantage is given to the user. Therefore, a strategy may be devised in terms of determination of whether or not the additional character and the selected character having the added attribute are to be included into the characters appearing in the game. In addition, the selected character can be selected from the plurality of characters possessed by the user itself. Therefore, the user can take a more variety of strategies.

The changing the setting in the game may include changing a parameter amount related to the selected character, which is updated in the game, so as to change an ability setting of the selected character having the added attribute such that an advantage is given to the user if the characters appearing in the game include at least one of the additional characters and the selected character having the added attribute, and the attribute added to the selected character having the added attribute corresponds to an attribute related to the additional character.

With the above feature, if the characters appearing in the game include the additional character and the selected character having the added attribute, a parameter amount related to the selected character, which is updated in the game, is changed. Therefore, a strategy may be devised in terms of determination of whether or not the additional character and the selected character having the added attribute are to be included into the characters appearing in the game.

The changing the setting in the game may include increasing a parameter in the game of the selected character having the added attribute so as to change an ability setting of the selected character having the added attribute such that an advantage is given to the user if the characters appearing in the game include at least one of the additional characters and the selected character having the added attribute, and the attribute added to the selected character having the added attribute corresponds to an attribute related to the additional character.

With the above feature, if the characters appearing in the game include the additional character and the selected character having the added attribute, a parameter in the game of the selected character having the added attribute is changed so as to change a setting in the game such that an advantage is given to the user. Therefore, a strategy may be devised in terms of determination of whether or not the additional character and the selected character having the added attribute are to be included into the characters appearing in the game. In addition, the selected character can be selected from the plurality of characters possessed by the user itself. Therefore, the user can take a more variety of strategies.

The at least one computer of the information processing system may further execute moving a location in a display image of the characters appearing in the game according to the user's operation. In this case, the changing the setting in the game may include changing the setting in the game based on a positional relationship between the characters displayed in the display image such that an advantage is given to the user, and changing the setting in the game, separately from the changing the setting in the game based on the positional relationship, if the characters appearing in the game include at least one of the additional characters and the selected character having the added attribute, and the attribute added to the selected character having the added attribute corresponds to an attribute related to the additional character.

With the above feature, a setting in the game is changed based on a combination of characters, separately from the system of changing the setting in the game based on a positional relationship between characters. Therefore, the user can take a more variety of strategies based on the positional relationship and combination of appearing characters.

The selecting the at least one character may include selecting a character other than the additional character from the plurality of characters possessed by the user, as the selected character.

With the above feature, the additional character is not allowed to be a selected character. Therefore, characteristics can be distributed among characters, and therefore, the user can take a still more variety of strategies.

The adding the attribute may further include, if the selected character have an already added attribute, deleting the already added attribute from the selected character, and adding an attribute related to the additional character to the selected character.

With the above feature, a plurality of attributes are not allowed to be added to the selected character, and therefore, a strategy may be devised in terms of determination of an attribute to be added to the selected character.

The non-limiting example embodiment may be carried out in the form of an information processing method.

According to the non-limiting example embodiment, a strategy may be devised in terms of determination of whether or not a specific character and a selected character are to be included into at least one character appearing in a game. In addition, a user is allowed to select the selected character from a plurality of characters possessed by the user itself. Therefore, the user can take a more variety of strategies.

These and other objects, features, aspects and advantages of the present non-limiting example embodiment will become more apparent from the following detailed description of the present non-limiting example embodiment when taken in conjunction with the accompanying drawings.

DETAILED DESCRIPTION OF NON-LIMITING EXAMPLE EMBODIMENTS

Figure 1:
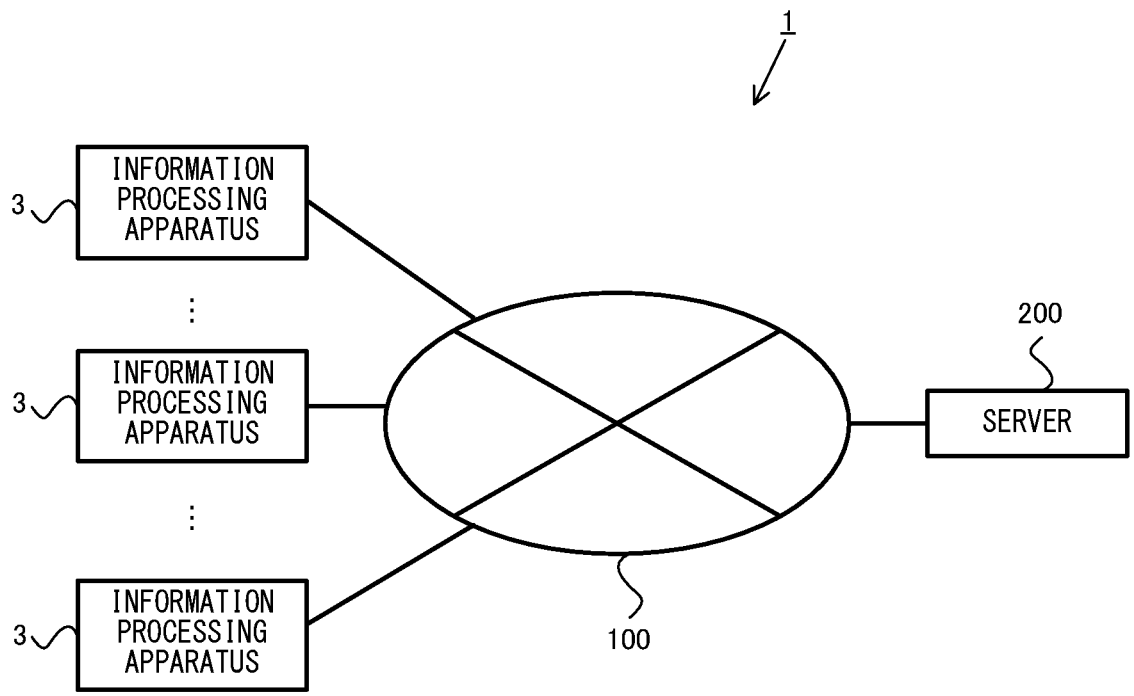
FIG. 1 is a diagram showing a non-limiting example of an information processing system according to a non-limiting example embodiment.

An information processing system according to a non-limiting example embodiment will be described with reference to FIG. 1. As shown in FIG. 1, an information processing system 1 that is a non-limiting example of the information processing system of the non-limiting example embodiment, includes information processing apparatuses 3 and a server 200, which are connected together through a network 100. Although FIG. 1 shows a plurality of information processing apparatuses 3, the information processing system 1 may include only a single information processing apparatus 3.

The information processing apparatuses 3 are configured to be able to connect to the network 100 through wireless or wired communication. The information processing apparatuses 3 and the server 200 constitute a client-server system. For example, the information processing apparatuses 3 can execute a predetermined application (e.g., a game application, etc.). The information processing apparatuses 3 can connect to and communicate with the server 200 through the network 100 by executing the above predetermined application. For example, the information processing apparatuses 3 can execute an information processing program that is stored in a replaceable storage medium, such as a memory card or an optical disc, or is received from another apparatus. The information processing apparatuses 3 may be a typical personal computer, stationary game machine, mobile telephone, handheld game console, personal digital assistant (PDA), etc.

Figure 2:
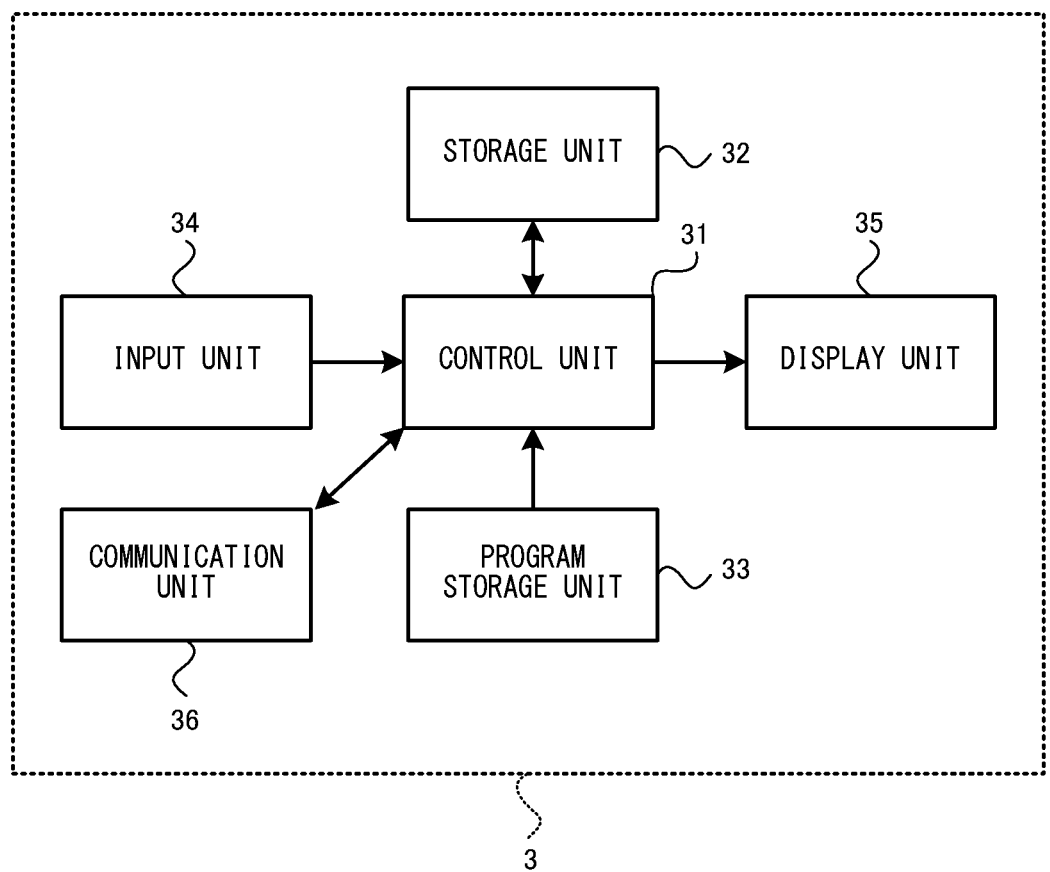
FIG. 2 is a block diagram showing a non-limiting example configuration of an information processing apparatus.

Next, the information processing apparatus 3 will be described with reference to FIG. 2. FIG. 2 is a block diagram showing a non-limiting example configuration of the information processing apparatus 3. In FIG. 2, the information processing apparatus 3 includes a control unit 31, a storage unit 32, a program storage unit 33, an input unit 34, a display unit 35, and a communication unit 36. It should be noted that the information processing apparatus 3 may include one or more devices including an information processing device including at least the control unit 31, and other devices.

The control unit 31 is an information processing means (computer) for executing various information processes, such as a CPU. For example, the control unit 31 has a function of executing the above application to perform information processes such as a game process described below, and data transmission and reception processes through the server 200. This function is performed by the control unit 31 (e.g., a CPU) executing predetermined programs.

The storage unit 32 stores various items of data that are used when the control unit 31 executes the above information processes. The storage unit 32 is, for example, a memory that can be accessed by the control unit 31 (e.g., a CPU).

The program storage unit 33 stores programs. The program storage unit 33 may be any storage device (storage medium) that can be accessed by the control unit 31. For example, the program storage unit 33 may be a storage device that is provided in the information processing device including the control unit 31, or a storage medium that is removably attached to the information processing device including the control unit 31. The program storage unit 33 may be a storage device (e.g., a server, etc.) that is connected to the control unit 31 through a network. The control unit 31 (CPU) may read all or a portion of a game program into the storage unit 32 and execute the read program with appropriate timing.

The input unit 34 is an input device that can be operated by a user. The input unit 34 may be any suitable input device.

The display unit 35 displays an image according to an instruction from the control unit 31. It should be noted that when the information processing apparatus 3 is a stationary game apparatus or a personal computer, the display unit 35 may be separated from the information processing apparatus 3.

The communication unit 36, which is a predetermined communication module, exchanges data with another apparatus (e.g., the server 200) or another information processing apparatus 3 through the network 100.

Figure 3:
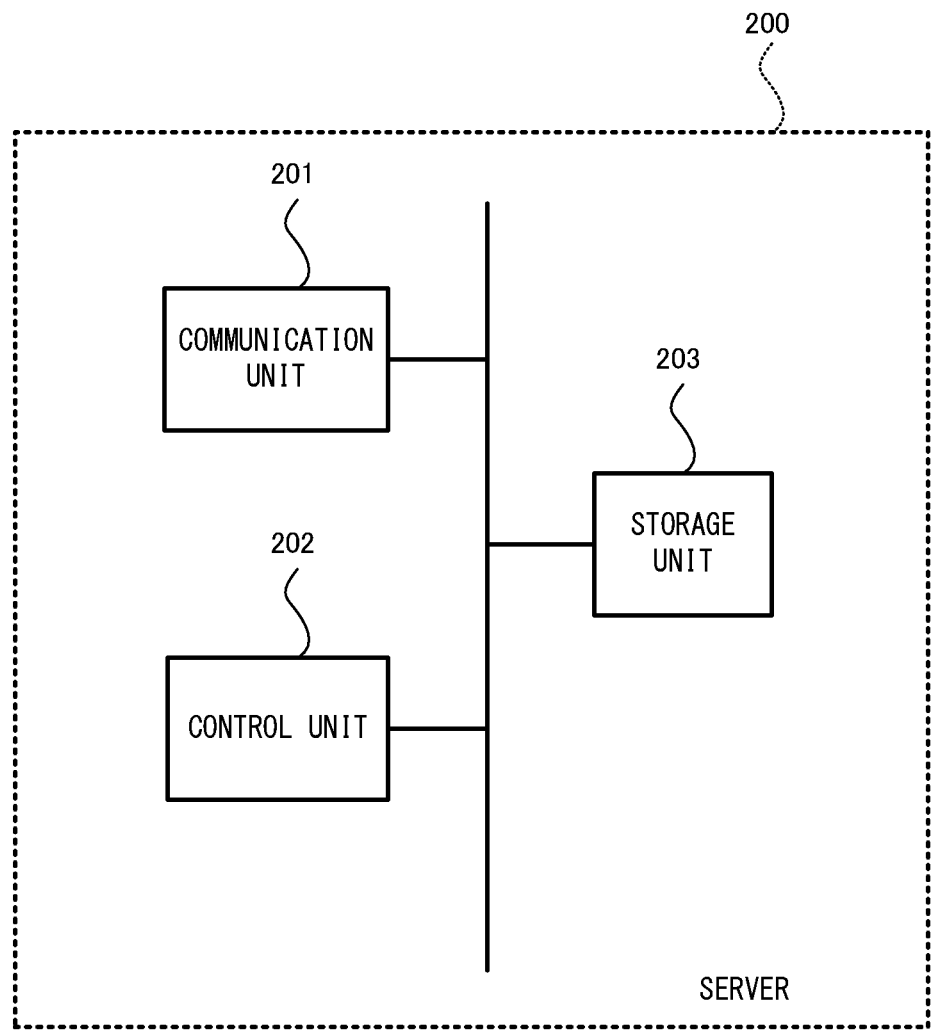
FIG. 3 is a block diagram showing a non-limiting example configuration of a server.

Next, the server 200 will be described with reference to FIG. 3. FIG. 3 is a block diagram showing a non-limiting example configuration of the server 200.

The server 200 has a communication unit 201, a control unit 202, and a storage unit 203. The communication unit 201 communicates with the information processing apparatuses 3, etc., through the network 100 by exchanging communication packets. The control unit 202 performs a process of managing the progress of a game performed along with the information processing apparatuses 3, a process of managing characters and items acquired by a user, and a process of managing information related to charging. The control unit 202 also establishes a communication link to the information processing apparatuses 3, etc., through the communication unit 201, and performs data transmission control and routing on the network 100. When a game is performed along with a plurality of information processing apparatuses 3, the control unit 202 manages a pairing or grouping of information processing apparatuses 3 that perform the game, and data communication between those information processing apparatuses 3. Here, the management of the progress of a game by the server 200 includes, for example, managing a period of time to which each season is assigned in the progress of a game. The management of information related to characters and items that are acquired by a user, that is performed by the server 200, includes, for example, managing a scheme in a game with which characters and items are randomly acquired according to a user's operation (random item offering scheme), i.e., controlling the types, acquisition probabilities, etc., of giver characters and gift items that a user acquires. The storage unit 203 stores programs that are executed by the control unit 202, various items of data used for the above processes, various items of data used for communication with the information processing apparatuses 3, etc. When the system employs a predetermined log-in process for data exchange performed through the network 100, the server 200 may perform an authentication process to determine whether or not a user who tries to log in is an authorized user. The server 200 may be a single server machine or may include a plurality of server machines. It should be noted that, in the non-limiting example embodiment, a giver character is used as an example of an additional character, and a gift item is used as an example of an item related to an attribute.

Figure 4:
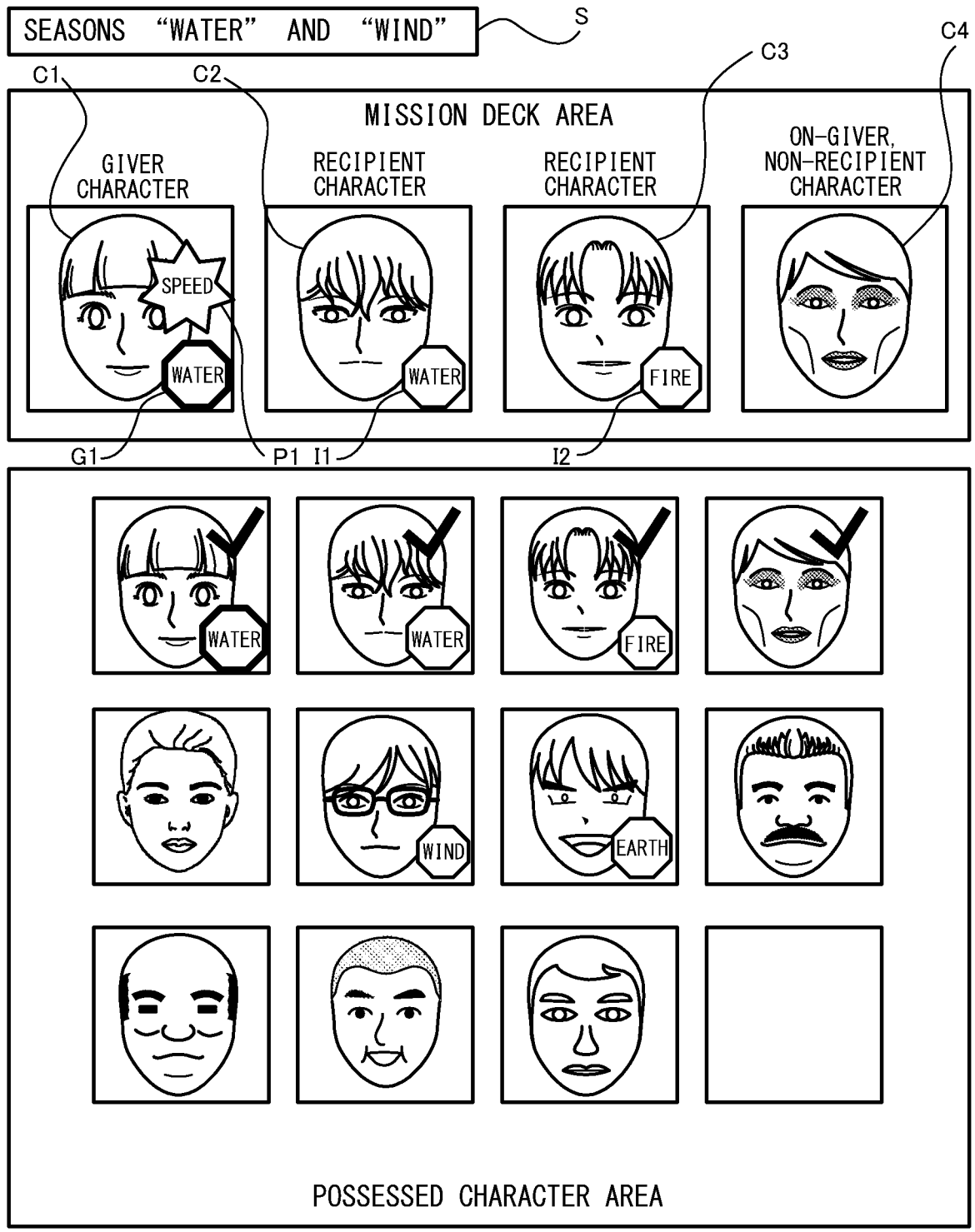
FIG. 4 is a conceptual diagram showing a non-limiting example of a mission configuration process performed in an information processing apparatus.
Figure 5:
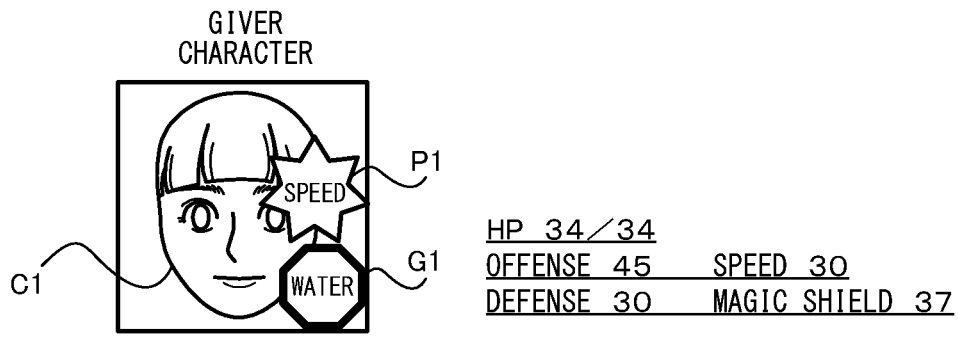
FIG. 5 is a conceptual diagram showing a non-limiting example in which a giver character gives an effect to a recipient character.
Figure 5:
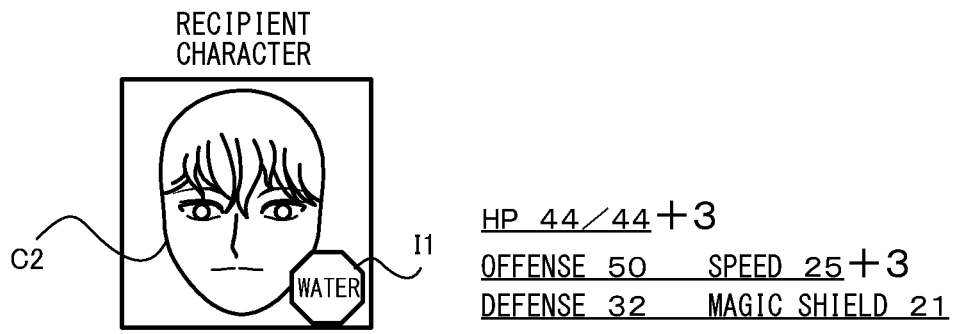

Next, before describing a specific process performed by the information processing apparatus 3 connected to the server 200, processes performed in the information processing system 1 will be outlined with reference to FIGS. 4 and 5. FIG. 4 is a conceptual diagram showing a non-limiting example of a mission configuration process that is performed in the information processing apparatus 3. FIG. 5 is a conceptual diagram showing a non-limiting example in which a giver character gives an effect to a recipient character. In the description that follows, employed is a game as a non-limiting example of an application that is executed by the information processing apparatus 3. Alternatively, other applications may be executed in the information processing apparatuses 3. It should be noted that, in the non-limiting example embodiment, a recipient character is used as a non-limiting example of a character that is selected by a user and to which an attribute is added.

A non-limiting example of a game process that is performed in the information processing apparatus 3 will be described with reference to FIG. 4. In FIG. 4, in a game in the non-limiting example embodiment, a plurality of characters possessed by a user can appear in the game and fight against an opposing character. For example, the user can move any of a plurality of characters provided in a possessed character area to a mission deck area according to an operation. In this non-limiting example game, an appearance group including a plurality of characters (e.g., four characters) can be configured in the mission deck area according to the user's operation, and the characters belonging to the appearance group provided in the mission deck area can make a mission to fight against an opposing character according to a predetermined mission operation. In another non-limiting example game, all characters possessed by a user may make a mission to fight against an opposing character. In this case, all characters possessed by a user can be interpreted as an appearance group.

For each character that appears in the game of the non-limiting example embodiment, a plurality of ability values for fighting against an opposing character are set. For example, for each character, ability values indicating hit points (HP: lethal attack power), offense power, defense power, speed, magic shield power, etc., are set. Characters that appear in the game of the non-limiting example embodiment are roughly divided into giver characters, recipient characters, and non-giver, non-recipient characters. A giver character can be acquired if a predetermined condition is satisfied. For example, a giver character can be acquired by lottery performed in a random item offering scheme according to the user's operation that requests acquisition of a giver character. A giver character can increase an ability of a recipient character if an attribute corresponding to information related to the giver character corresponds to (e.g., is identical to) an attribute indicated by a gift item given to the recipient character. A recipient character has a gift item indicating a predetermined attribute, and is given an ability by a giver character if the predetermined attribute corresponds to (e.g., is identical to) an attribute of the giver character. A non-giver, non-recipient character is another character that is neither a giver character nor a recipient character, and is never given an ability by a giver character.

Here, the user can select, from characters possessed by the user, one to which a gift item is to be given. For example, an operation of selecting a character to which a gift item is to be given so that the character will be a recipient character, from the a plurality of characters provided in the possessed character area shown in FIG. 4, is performed, and thereafter, an operation of giving a type of a gift item to the selected character is performed, so that the gift item is given to the selected character. Thus, a recipient character and a non-giver, non-recipient character can be selected by the user itself. It should be noted that the number of recipient characters that can be set by the user can be limited by limiting the number of gift items that can be given. In the non-limiting example embodiment, a gift item that is given to a selected character is used as a non-limiting example of an item that is related to an attribute that is added to a selected character.

A character C1 shown in FIG. 4 is a giver character, which can increase an ability of a recipient character if a predetermined condition is satisfied. More specifically, a giver character has, as a default setting, an attribute to increase an ability of a recipient character since when the giver character is acquired. For example, the giver character C1 is assigned a label G1 indicating an attribute "water." Here, an attribute to increase an ability of a recipient character is one that is selected from a plurality of attributes, e.g., four attributes "water," "fire," "wind," and "earth." A giver character also has at least one parameter to increase an ability of a recipient character. For example, the giver character C1 is assigned a label P1 indicating an ability increase item "speed." A parameter to increase an ability of a recipient character is selected from a plurality of parameters, e.g., four ability increase items "offense power," "defense power," "speed," and "magic shield power." All giver characters may additionally have a common parameter to increase an ability of a recipient character. For example, such a common increase parameter is an ability increase item "HP." It should be noted that an attribute to increase an ability of a recipient character that is set in a giver character may be a category to which the giver character belongs (or an attribute to which the giver character belongs), or a category (attribute) corresponding to information related to the giver character (e.g., information related to the label G given to a giver character).

A character C2 shown in FIG. 4 is a recipient character, which is given an ability by a giver character if a predetermined condition is satisfied. More specifically, a recipient character has a gift item indicating an attribute of a giver character that is related to an ability that the giver character can give to the recipient character. For example, the recipient character C2 has a gift item I1. For example, the gift item I1 indicates the attribute "water." When a recipient character having that item makes a mission along with a giver character belonging to the attribute "water," an ability value corresponding to an ability increase item set in the giver character is given to the recipient character by the giver character, so that the ability value of the recipient character increases. In the non-limiting example of FIG. 4, the recipient character C2 having the gift item I1 indicating the attribute "water" makes a mission along with the giver character C1 belonging to the same attribute "water," and therefore, an ability value of the recipient character C2 corresponding to the ability increase item "speed" set specifically to the giver character C1, and an ability value of the recipient character C2 corresponding to the ability increase item "HP" common to all giver characters, increase during the mission. Although, as described above, a character selected by the user is given a gift item so that the selected character is set as a recipient character, it is arbitrarily determined what gift item (attribute) is to be given to the selected character. Specifically, auxiliary information can be added to a character selected by the user by an attribute indicated by a gift item given to the selected character, and not only a fixed attribute is set in the selected character. Characters to which a gift item is given are not limited. A gift item may be given to any appropriate character.

An ability given to a recipient character by a giver character is effective as long as the recipient character and the giver character participate in a fight in the same appearance group. In other words, an ability given to a recipient character by a giver character is effective during a fight irrespective of the positional relationship and motions of the giver character and the recipient character. Alternatively, in the non-limiting example embodiment, if, after two characters in an appearance group have started a mission, the characters are in a predetermined positional relationship in a virtual world (e.g., the characters are located adjacent to each other or at the same position), an ability of at least one of the characters may be increased. In this case, to give an ability to a recipient character by a giver character is performed separately from to increase an ability depending on the positional relationship. It should be noted that if, in a fight after a giver character and a recipient character have started a mission in the same appearance group, the giver character is defeated and can no longer fight, an ability given to the recipient character by the giver character may be made ineffective, or may be effective until the fight ends.

A character C3 shown in FIG. 4 is also a recipient character, which is given an ability by a giver character if a predetermined condition is satisfied. For example, the recipient character C3 has a gift item I2. For example, the gift item I2 indicates the attribute "fire." When a recipient character having that item makes a mission along with a giver character belonging to the attribute "fire," an ability value corresponding to an ability increase item set in the giver character is given to the recipient character by the giver character, so that the ability value of the recipient character increases. However, in the non-limiting example of FIG. 4, the recipient character C3 having the gift item I2 indicating the attribute "fire" makes a mission along with the giver character C1 belonging to the different attribute "water," and therefore, an ability is not given to the recipient character C3 by the giver character C1, because the predetermined condition is not satisfied.

A character C4 shown in FIG. 4 is a non-giver, non-recipient character. In the non-limiting example of FIG. 4, the non-giver, non-recipient character C4 makes a mission along with the giver character C1 belonging to the attribute "water." However, since the non-giver, non-recipient character C4 does not have a gift item, an ability is not given to the non-giver, non-recipient character C4 by the giver character C1.

In addition, an effect is given to a recipient character by a giver character only during a predetermined period of time. For example, in the game of the non-limiting example embodiment, a season is set for each attribute of a giver character. For example, seasons "water," "fire," "wind," and "earth" are set for the attributes "water," "fire," "wind," and "earth," respectively. The seasons, i.e., the corresponding attributes, regularly and successively change. For example, in the game of the non-limiting example embodiment, the seasons (attributes) change monthly (or every 4 weeks), and in parallel with this, the seasons (attributes) change weekly, i.e., and the monthly seasons (attribute) and the weekly seasons (attribute) coexist, but the same monthly and weekly seasons (attributes) do not simultaneously take place. In other words, in the game, a monthly season corresponding to a certain attribute and a weekly season corresponding to an attribute different to that attribute are simultaneously set, and therefore, two different seasons corresponding to different attributes inevitably take place simultaneously. For example, in the non-limiting example of FIG. 4, a season report S shows that the current time is in the water season corresponding to the attribute "water" and the wind season corresponding to the attribute "wind."

An effect is given to a recipient character by a giver character only if an attribute of the giver character is the same as an attribute corresponding to the current period of time or the current monthly or weekly season (i.e., a period of time including the present time or a season set at the present time). In the non-limiting example of FIG. 4, the attribute "water" of the giver character C1 is the same as the attribute "water" corresponding to one of the current seasons, and therefore, an effect is given to the recipient character C2 having the gift item I1 indicating the attribute "water" during a mission. Meanwhile, when a giver character belonging to the attribute "fire" makes a mission along with the recipient character C3 having the gift item I2 indicating the attribute "fire," an effect is not given to the recipient character C3 by that giver character, because the attribute "fire" of the recipient character C3 is not the same as the attribute "water" or the attribute "wind" during the seasons corresponding to the attributes "water" and "wind."

It should be noted that the monthly seasons (attributes) and the weekly seasons (attributes) take place in any orders that do not allow the monthly and weekly seasons corresponding to the same attribute to take place simultaneously. For example, during a period of time in which a certain giver character can be acquired, a season corresponding to an attribute of the giver character may be set.

A specific non-limiting example in which an effect is given to the recipient character C2 by the giver character C1 will be described with reference to FIG. 5. As shown in FIG. 5, the giver character C1 belongs to the attribute "water" and has the ability increase item "speed." In this case, when the giver character C1 makes a mission along with a recipient character having a gift item indicating the attribute "water" during a season corresponding to the attribute "water," the ability values of the specific increase item "speed" and the common increase item "HP" of the recipient character increase (e.g., each ability value increases by +3) without an increase or decrease in an ability value of the giver character C1. The recipient character C2, which makes a mission along with the giver character C1, has the gift item I1 indicating the attribute "water." Therefore, when the recipient character C2 makes a mission along with a giver character belonging to the attribute "water" during a season indicating the attribute "water," the ability values of the specific increase item "speed" and the common increase item "HP" of the recipient character C2 increase (e.g., each ability value increases by +3).

Thus, if information (e.g., an attribute) corresponding to information related to a giver character corresponds to (e.g., is identical to) information (e.g., an attribute) indicated by auxiliary information (e.g., a gift item) added to a recipient character, then when an appearance group including both the giver character and the recipient character makes a mission during a period of time in which the information is set (e.g., during a season in which the identical attribute is set), an ability of the recipient character increases, and therefore, a setting in the game in which a character belonging to the appearance group fights against an opposing character is changed such that an advantage is given to the user. Here, as described above, the user itself can select a recipient character from those possessed by the user. Therefore, in the game of the non-limiting example embodiment in which a portion of a plurality of characters possessed by the user make a mission, the user can take a more variety of strategies.

In the foregoing non-limiting example embodiment, a giver character belongs to an attribute as a default setting since when the giver character is acquired. Alternatively, an ability and attribute of a giver character may be set according to the user's operation. A giver character may have a gift item and may be allowed to make a mission as a recipient character.

In a typical case, a gift item is limited, and therefore, when a gift item is given to a recipient character, the gift item cannot be given to another recipient character. When a new gift item is given to a recipient character which has had another gift item, the recipient character is allowed to have the new gift item by destroying the old gift item. Thus, a gift item that has once been given to a character selected according to the user's operation cannot be reused for another character, and no two or more gift items are simultaneously possessed by a single character, and therefore, gift items are very valuable to users. If a period of time during which a user can acquire a gift item is reduced, the rarity of gift items can be further increased, and therefore, to acquire a gift item is a valuable option that a user can take as a strategy. If such an effect is not expected, gift items may be dealt with in other fashions. For example, a single character may be allowed to simultaneously have a plurality of gift items, or a gift item may be allowed to be removed from one character and reused for another character. A gift item given to a recipient character may be allowed to be permanently possessed by the recipient character unless a user performs an operation of destroying the gift item, or may be destroyed if a predetermined condition is satisfied (e.g., the possession period expires). When a gift item is given to a character selected by a user, an attribute may be randomly set in the selected character.

In the foregoing non-limiting example embodiment, when an attribute of a giver character corresponds to an attribute indicated by a gift item possessed by a recipient character, an ability value of the recipient character increases, so that a setting in the game in which the recipient character makes a mission is changed such that an advantage is given to the user. Also, a setting may be changed in other fashions. As a first non-limiting example, when an attribute of a giver character corresponds to an attribute indicated by a gift item possessed by a recipient character, an ability value of the recipient character may decrease, so that a setting in the game in which the recipient character makes a mission is changed such that a disadvantage is given to the user. As a second non-limiting example, when an attribute of a giver character corresponds to an attribute indicated by a gift item possessed by a recipient character, a portion of the ability values of the recipient character may increase while another portion of the ability values of the recipient character may decrease, so that a parameter may be changed to change a setting in the game in which the recipient character makes a mission such that an advantage is given to the user while another parameter may be changed to change a setting in that game such that a disadvantage is given to the user. As a third non-limiting example, when an attribute of a giver character corresponds to an attribute indicated by a gift item possessed by a recipient character, an ability value of the recipient character may be changed, and in addition, an ability value of the giver character may be changed. In this case, for an ability value of the giver character, at least a portion of the parameters may increase, at least a portion of the parameters may decrease, or a portion of the parameters may increase while another portion of the parameters may decrease.

In the foregoing non-limiting example embodiment, one selected from the four items "offense power," "defense power," "speed," and "magic shield power" is set as an ability increase item of a recipient character that increases specifically to an attribute of a giver character. Alternatively, two or more ability increase items of a recipient character may increase. An attribute of a giver character and an ability increase item of a recipient character that increases specifically to the attribute may be previously fixed. Although, in the foregoing, there is a common ability (i.e., HP) of a recipient character that increases non-specifically to an attribute of a giver character, such a common ability of a recipient character may not be set.

Although an attribute indicating a nature, characteristic, etc., that is possessed by a giver character is used as a non-limiting example of information related to the giver character, a category that may include a type, class, genre, etc., of a giver character may be used as information related to the giver character in addition to the attribute.

In the foregoing non-limiting example embodiment, a setting in a game is changed such that an advantage and/or a disadvantage are given to a user, by causing a giver character to increase/decrease an ability of a recipient character. Alternatively, a setting in a game is changed such that an advantage and/or a disadvantage are given to a user, by changing another setting without changing an ability value of the recipient character: such as increasing damage to an opposing character during an attack (e.g., due to acquisition of an effective technique or weapon or a bonus point, etc.) or decreasing it (e.g., due to loss of an effective technique or weapon or a bonus point, etc.); increasing or decreasing a recovery time or recovery amount with respect to a reduction in HP or extraordinary state of the recipient character; increasing or decreasing the agility of an opposing character; increasing or decreasing an experience value or skill point that is acquired by the recipient character in a fight; increasing or decreasing a play time for which the recipient character can be used; increasing or decreasing the stamina consumption of the recipient character; increasing or decreasing a reward that is acquired by the recipient character; changing an environment to one that is favorable or unfavorable to the recipient character; employing a map that is favorable or unfavorable to the recipient character; selecting a route that is advantageous or disadvantageous to the recipient character; changing the frequency of appearance of an opposing character that the recipient character is more likely to defeat or is less likely to defeat; changing the degree of difficulty in succeeding or winning; changing the order in which the recipient character attacks; or changing the recipient character to a stronger or weaker character.

When an appearance group including a plurality of giver characters belonging to the same attribute and a recipient character having a gift item indicating that attribute makes a mission, the giver characters may give a combination of effects to the recipient character, or only one of the giver characters may give an effect to the recipient character. In the former case, if different ability increase items are set in the different giver characters, the ability value of each ability increase item of the recipient character increases. If the same ability increase item is set in the different giver characters, the increase amounts of the ability value of that ability increase item of the recipient character are added up. When an appearance group including a giver character and a plurality of recipient characters having a gift item indicating the same attribute of the giver character, the giver character may give an effect to all the recipient characters or only one of the recipient characters.

A giver character may belong to a plurality of attributes. In this case, if a giver character belongs to two or more attributes corresponding to seasons, the giver character can give an effect to recipient characters having gift items indicating the attributes. For example, when the current seasons are "water" and "fire," a giver character belonging to the two attributes "water" and "fire" can give an ability to a recipient character having a gift item indicating the attribute "water" and a recipient character having a gift item indicating the attribute "fire."

An attribute to which a giver character can belong may be fixed to a single attribute instead of being selectable from a plurality of attributes. In this case, an attribute that can be indicated by a gift item is fixed to a single attribute, and a season is inevitably set to that attribute. In this case, if an appearance group includes a giver character and a recipient character, the condition for giving an ability to a recipient character is satisfied. Therefore, if a plurality of characters that appear in the game includes a giver character and a recipient character having a received gift item, a setting in the game is changed such that an advantage is given to a user. In this case, the season that is set is a period of time for indicating whether or not a setting in the game is changed such that an advantage is given to a user. Therefore, during that period of time, when an appearance group including a giver character and a recipient character fights, the condition for allowing a giver character to give an ability to a recipient character is satisfied.

Figure 6:
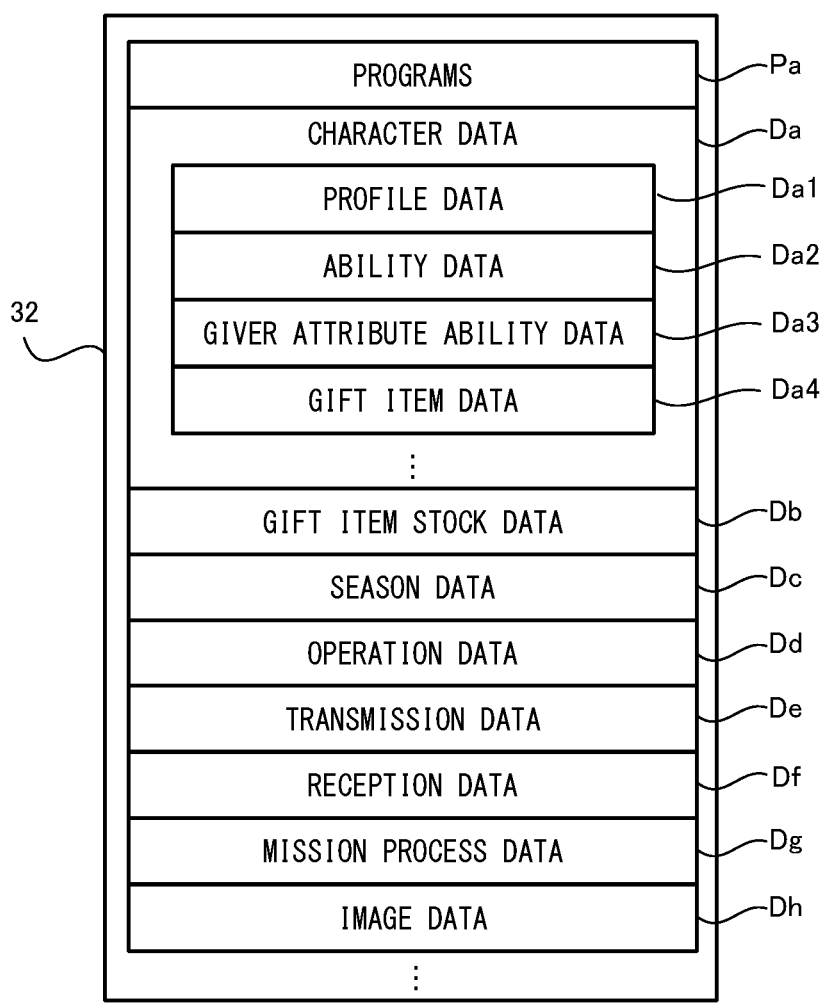
FIG. 6 is a diagram showing a non-limiting example of main data and programs stored in a storage unit of an information processing apparatus.

Next, a process performed in the information processing apparatus 3 will be described in detail. Firstly, data that is mainly used in the process performed in the information processing apparatus 3 will be described with reference to FIG. 6. FIG. 6 is a diagram showing a non-limiting example of main data and programs stored in the storage unit 32 of the information processing apparatus 3.

As shown in FIG. 6, the storage unit 32 stores, in a data storage area thereof, character data Da, gift item stock data Db, season data Dc, operation data Dd, transmission data De, reception data Df, mission process data Dg, image data Dh, etc. It should be noted that, in addition to data included in the information shown in FIG. 6, the storage unit 32 stores data for use in the process, such as data for use in an application that is executed. The storage unit 32 also stores, in a program storage area thereof, various programs Pa including a communication program and an information processing program (game program).

The character data Da indicates a profile and ability value of each character possessed by a user, and includes profile data Da1, ability data Da2, giver attribute ability data Da3, gift item data Da4, etc. The profile data Da1 indicates a name, external appearance, sex, size, nature, characteristic (including a movement characteristic), feature, type, class, genre, etc., of a character. The ability data Da2 indicates ability values of a character such as HP, offense power, defense power, speed, and magic shield power. The giver attribute ability data Da3 indicates whether or not a character is a giver character, and if the character is a giver character, indicates an attribute of the character, and an ability increase item and increase amount in which the character gives an ability to a recipient character. The gift item data Da4 is a non-limiting example of data that is related to an item related to an attribute, indicates whether or not a gift item is possessed, and if a gift item is possessed, indicates an attribute indicated by the gift item.

The gift item stock data Db indicates the number of gift items currently possessed for each type.

The season data Dc indicates attributes of seasons that are set at the current time (i.e., the current seasons).

The operation data Dd indicates operation information about a user's operation on the information processing apparatus 3. For example, operation data indicating that the input unit 34 has been operated is acquired every unit processing time (e.g., 1/60 sec) of the information processing apparatus 3, and is stored and updated in the operation data Dd each time the acquisition takes place.

The transmission data De is stored data that is to be transmitted to the server 200. The reception data Df is data that has been received from the server 200.

The mission process data Dg is used in the game when a character in a mission fights against an opposing character, and includes data indicating each character belonging to an appearance group, data indicating a location, motion, etc., of each character in a fight, etc. The image data Dh is for displaying an image on a display screen in the game.

Figure 7:
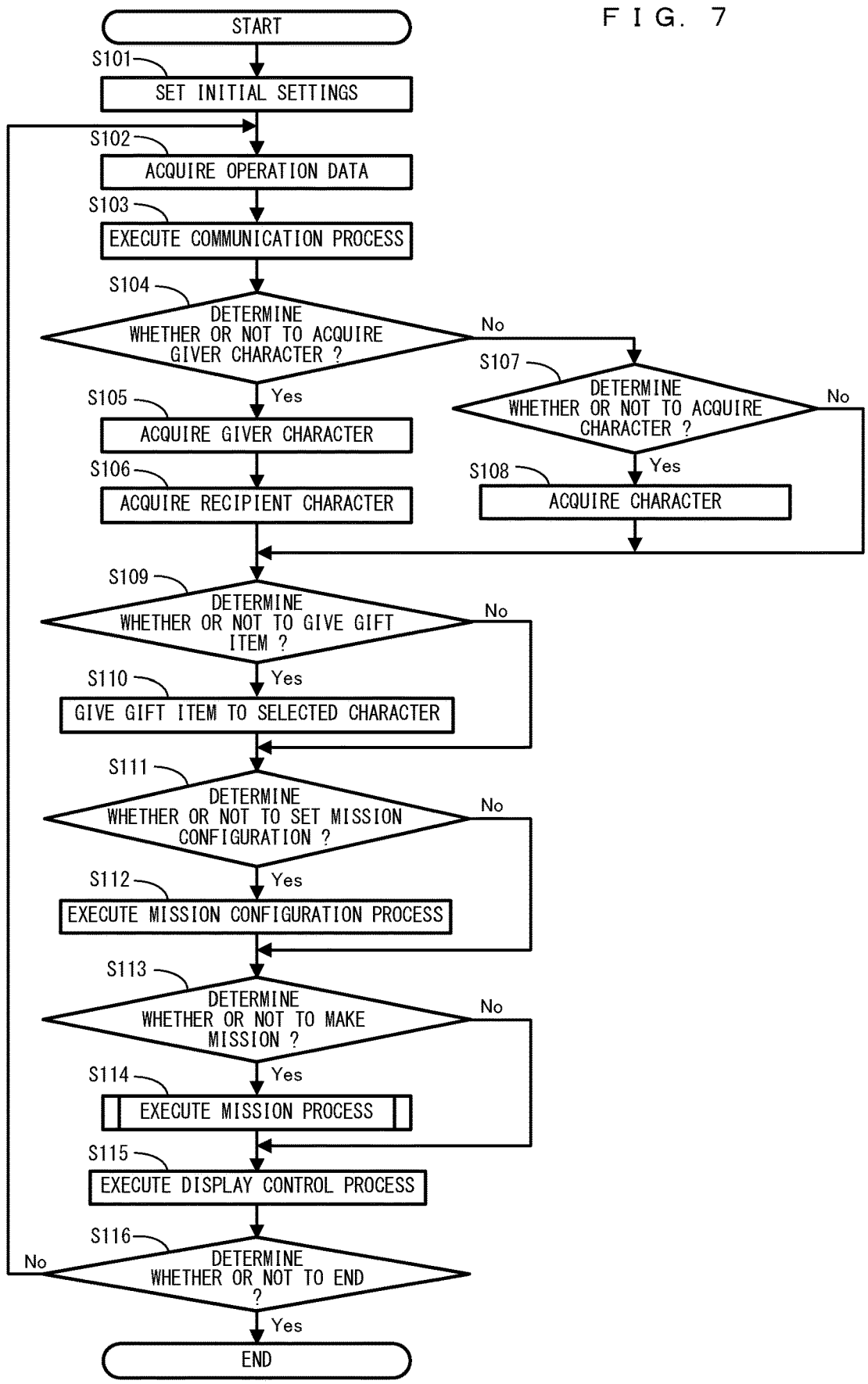
FIG. 7 is a flowchart showing a non-limiting example of a process that is executed in an information processing apparatus.
Figure 8:
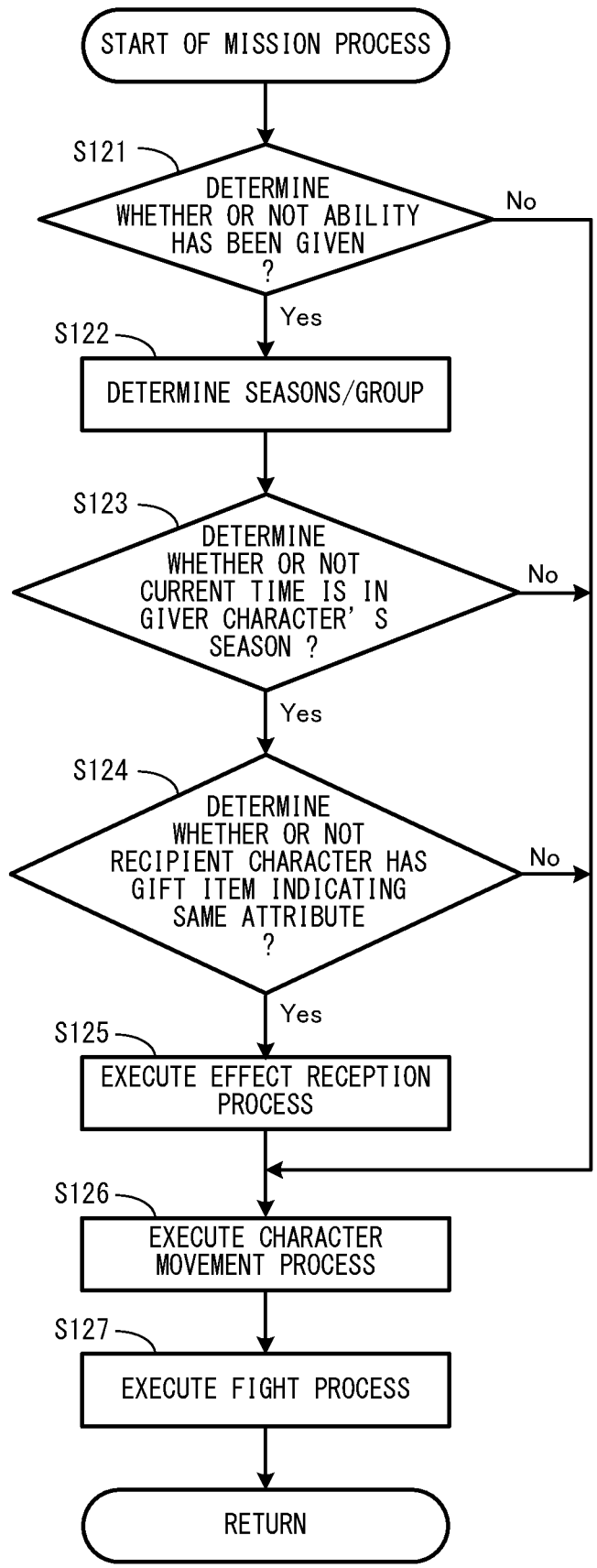
FIG. 8 is a flowchart showing a non-limiting example of a subroutine that is a detailed process of a mission process in a step of FIG. 7.

Next, a process performed in the information processing apparatus 3 will be described with reference to FIGS. 7 and 8. FIG. 7 is a flowchart showing a non-limiting example of a process that is executed in the information processing apparatus 3. FIG. 8 is a diagram showing a subroutine indicating a non-limiting example of a detailed process of a mission process in step S114 of FIG. 7. Here, concerning the flowcharts of FIGS. 7 and 8, of the processes in the information processing system 1, a game process that is performed while the information processing apparatus 3 is communicating with the server 200 in a state in which the information processing apparatus 3 and the server 200 can communicate with each other, will be mainly described, and other processes that are not directly involved with those processes will not be described in detail. In FIGS. 7 and 8, each "step" executed by the control unit 31 is abbreviated to "S."

In the non-limiting example embodiment, steps shown in FIGS. 7 and 8 are performed by the control unit 31 (CPU) executing a communication program or game program stored in the program storage unit 33. It should be noted that the processes of FIGS. 7 and 8 are started with any appropriate timing. At this time, all or a portion of the communication program or game program is read from the storage unit 32 with appropriate timing, and is executed by the control unit 31. Thus, the processes of FIGS. 7 and 8 are started. It should be noted that the communication program and the game program are assumed to be previously stored in the program storage unit 33. In another non-limiting example embodiment, the communication program and the game program may be obtained from a storage medium removably attached to the information processing apparatus 3, and stored in the storage unit 32, or may be obtained from another apparatus through a network, such as the Internet, and stored in the storage unit 32.

The steps of the flowcharts of FIGS. 7 and 8 are merely illustrative, and if a similar result is obtained, the order in which the steps are performed may be changed, and another step may be executed in addition to or instead of each step. Although, in the non-limiting example embodiment, it is assumed that each step of the flowcharts is executed by the control unit 31, all or a portion of the steps of the flowcharts may be executed by a processor other than the CPU of the control unit 31 or a dedicated circuit.

In FIG. 7, the control unit 31 sets initial settings (step S101), and control proceeds to the next step. For example, the control unit 31 initially sets parameters for use in the following steps. The control unit 31 also sets initial settings for the character data Da for each character that is currently possessed. The control unit 31 also sets the current seasons based on a time table for setting seasons corresponding to attributes of a giver character, and sets the season data Dc using attributes of the seasons thus set.

Next, the control unit 31 acquires operation data from the input unit 34 and updates the operation data Dd (step S102), and control proceeds to the next step.

Next, the control unit 31 performs a communication process (step S103), and control proceeds to the next step. For example, the control unit 31 transmits transmission data stored in the transmission data De to the server 200 through the network 100. The control unit 31 receives data from the server 200 through the network 100, and updates the reception data Df using the received data. For example, when a process of newly acquiring a character or an item using a random item offering scheme has been performed according to a user's operation, the control unit 31 transmits, to the server 200, data stored in the transmission data De that requests that acquisition. The control unit 31, when receiving data indicating the newly acquired character or item from the server 200 in response to the request, updates the reception data Df using the received data. When a game is played in only the information processing apparatus 3 itself or along with another information processing apparatus 3, the control unit 31 exchanges data for playing the game with the server 200, as appropriate, in step S103.

Next, the control unit 31 determines whether or not to newly acquire a giver character (step S104). If the determination result is positive (the control unit 31 determines to newly acquire a giver character), control proceeds to step S105. Otherwise (the control unit 31 determines not to newly acquire a giver character), control proceeds to step S107. For example, if the control unit 31 determines, by referring to the operation data Dd, that the user's operation of newly acquiring a character using a random item offering scheme has been performed, the control unit 31 acquires data indicating a newly acquired character that has been received from the server 200, from the reception data Df. If the character indicated by the data received from the server 200 is a giver character, the result of the determination by the control unit 31 in step S104 is positive. Meanwhile, if the user's operation of newly acquiring a character has not been performed or the character indicated by the data received from the server 200 is not a giver character, the result of the determination by the control unit 31 in step S104 is negative.

In step S105, the control unit 31 performs a process of newly acquiring a giver character, and control proceeds to the next step. For example, based on data indicating a newly acquired giver character that has been received from the server 200, the control unit 31 sets data (the profile data Da1, the ability data Da2, the giver attribute ability data Da3, the gift item data Da4, etc.) indicating the giver character, and newly adds character data Da. Thereafter, the control unit 31 sets a game image that reports that a giver character has been newly acquired, and displays the game image in a display control process of step S115 described below.

Next, the control unit 31 performs a process of newly acquiring a gift item, and control proceeds to step S109. For example, the control unit 31 updates the gift item stock data Db so that a gift item indicating an attribute of the giver character newly added in step S105 is added to the stock. Thereafter, the control unit 31 sets a game image that reports that a gift item has been newly added, and displays the game image in a display control process of step S115 described below.

Meanwhile, if the control unit 31 determines in step S104 that a giver character has not been newly acquired, the control unit 31 determines whether or not a character has been newly acquired (step S107). If the determine result is positive (the control unit 31 determines to newly acquire a character), control proceeds to step S108. Otherwise (the control unit 31 has not newly acquired a character), control proceeds to step S109. For example, if the control unit 31 determines, by referring to the operation data Dd, that the user's operation of newly acquiring a character using a random item offering scheme has been performed, the control unit 31 acquires data indicating a newly acquired character that has been received from the server 200, from the reception data Df. If the character indicated by the data received from the server 200 is not a giver character (i.e., is typically a non-giver, non-recipient character), the result of the determination by the control unit 31 in step S107 is positive. Meanwhile, if the user's operation of newly acquiring a character has not been performed or the data received from the server 200 indicates that a giver character has been newly acquired, the result of the determination by the control unit 31 in step S107 is negative.

In step S108, the control unit 31 performs a process of newly acquiring a character (non-giver, non-recipient character), and control proceeds to step S109. For example, based on the data indicating the newly acquired character that has been received from the server 200, the control unit 31 sets data (the profile data Da1, the ability data Da2, the giver attribute ability data Da3, the gift item data Da4, etc.) of the character, and newly adds the data to the character data Da. Thereafter, the control unit 31 sets a game image that reports that a character has been newly acquired, and displays the game image in a display control process of step S115 described below.

In step S109, the control unit 31 determines whether or not to give a gift item to a character. If the determination result is positive (the control unit 31 determines to give a gift item to a character), control proceeds to step S110. Otherwise (the control unit 31 determines not to give a gift item to a character), control proceeds to step S111. For example, if the control unit 31 determines, by referring to the operation data Dd, that the user's operation of selecting a character that is to be given a gift item has been selected from those possessed by the user, and giving a gift item to the selected character, has been performed, the result of the determination by the control unit 31 in step S109 is positive.

In step S110, the control unit 31 gives a gift item to the selected character, and control proceeds to step S111. For example, the control unit 31 extracts the character data Da of the character selected according to the user's operation, and updates transmission item data Da4 in the character data Da using data indicating the possession of the gift item and an attribute indicated by the gift item. Thereafter, the control unit 31 subtracts the gift item given to the selected character from the stock, and updates the gift item stock data Db.

In step S111, the control unit 31 determines whether or not to set a mission configuration. If the determination result is positive (the control unit 31 determines to set a mission configuration), control proceeds to step S112. Otherwise (the control unit 31 determines not to set a mission configuration), control proceeds to step S113. For example, if the control unit 31 determines, by referring to the operation data Dd, that the user's operation of configuring an appearance group from the possessed characters has been performed, the result of the determination by the control unit 31 in step S111 is positive.

In step S112, the control unit 31 performs a process of setting a mission configuration, and control proceeds to step S113. For example, the control unit 31 creates a mission configuration setting screen in which a mission deck area and a possessed character area are displayed as shown in FIG. 4, produces, based on the character data Da, an image in which images showing characters possessed at the current time are arranged in the possessed character area, and displays the game image in a display control process of step S115 described below. The control unit 31 also selects a character(s) for which the user's operation of including a character into an appearance group has been performed, by referring to the operation data Dd, produces an image in which images showing the characters are arranged in the mission deck area, and displays the game image in a display control process of step S115 described below. The control unit 31 also extracts the character data Da of the characters for which the user's operation of including a character into an appearance group has been performed, as characters that will make a mission.

In step S112, if a character to be displayed in the mission deck area and/or the possessed character area is a giver character or a recipient character, the control unit 31 may display an image that allows the type of the character to be identified. For example, as shown in FIG. 4, the control unit 31 may give a label G indicating an attribute of a giver character, a label P indicating an ability increase item of a giver character, or a gift item I possessed by a recipient character to the giver or recipient character's image, and display the resultant image, thereby indicating the type or attribute of each character.

In step S113, the control unit 31 determines whether or not to make a mission to fight against an opposing character. If the determine result is positive (the control unit 31 determines to make a mission), control proceeds to step S114. Otherwise (the control unit 31 determines not to make a mission), control proceeds to step S115. For example, if the control unit 31 determines, by referring to the operation data Dd, that the user's operation of making a mission has been performed, or a character is fighting against an opposing character, the result of the determination by the control unit 31 in step S113 is positive.

In step S114, the control unit 31 performs a mission process, and control proceeds to step S115. The mission process performed in step S114 will now be described with reference to FIG. 8.

As shown in FIG. 8, the control unit 31 determines whether or not to perform a "give determination" to determine whether or not an ability has been given during a mission (step S121). If the determination result is positive (the control unit 31 determines to perform the give determination), control proceeds to step S122. Otherwise (the control unit 31 determines not to perform the give determination), control proceeds to step S126. For example, if the current time is immediately after the start of a mission and the give determination has not been performed during the mission, the result of the determination by the control unit 31 in step S121 is positive. Meanwhile, if the give determination has been performed for the current mission, the result of the determination by the control unit 31 in step S121 is negative.

In step S122, the control unit 31 determines the types of the current seasons and the characters included in the appearance group, and control proceeds to the next step. For example, the control unit 31 acquires attributes of seasons set at the current time (current seasons) by referring to the season data Dc. The control unit 31 determines, by referring to the character data Da of each mission character, a characteristic of each character, i.e., whether or not each character is a giver character or a recipient character, and if a character is a giver character, extracts an attribute, ability increase item, and increase amount of the giver character, or if a character is a recipient character, extracts an attribute indicated by a gift item possessed by the recipient character. The control unit 31 also places the characters set as mission characters, which are included in the appearance group, at respective initial placement positions on a fight map, and updates the mission process data Dg using the initial placement positions.

Next, the control unit 31 determines whether or not an attribute of a giver character in the appearance group is the same as an attribute of either current season (step S123). If the determination result is positive (the control unit 31 determines that an attribute of the giver character is the same as an attribute of either current season), control proceeds to step S124. Otherwise (the control unit 31 determines that an attribute of the giver character is not the same as an attribute of either current season), control proceeds to step S126. For example, if the appearance group analyzed in step S122 includes a giver character, and at least one of the attributes of the giver character is the same as an attribute of at least one of the current seasons, the result of the determination by the control unit 31 in step S123 is positive. Meanwhile, if the appearance group analyzed in step S122 does not include a giver character, or none of the attributes of the giver character is the same as an attribute of either current season, the result of the determination by the control unit 31 in step S123 is negative.

In step S124, concerning the giver character belonging to the same attribute of either current season, the control unit 31 determines whether or not the appearance group includes a recipient character having a gift item indicating that attribute. If the determination result is positive (the control unit 31 determines that the appearance group includes a recipient character having a gift item indicating that attribute), control proceeds to step S125. Otherwise (the control unit 31 determines the appearance group does not include a recipient character having a gift item indicating that attribute), control proceeds to step S126.

In step S125, the control unit 31 performs an effect reception process of allowing a recipient character to receive an ability from a giver character, and control proceeds to step S126. For example, concerning a pair of a giver character and a recipient character that it has been determined in step S124 belong to the same attribute, the control unit 31 extracts an ability increase item set for the giver character and an increase amount thereof. Thereafter, the control unit 31 increases a parameter corresponding to the ability increase item, of the ability values of the recipient character paired with the giver character, by the increase amount, and updates the ability character data Da2 of the recipient character. If the giver characters have a common ability increase item, the control unit 31 increases a parameter corresponding to the common ability increase item, of the ability values of the recipient character, by a predetermined increase amount, and updates the ability character data Da2 of the recipient character. It should be noted that if there are a plurality of pairs of a giver character and a recipient character that it has been determined in step S124 belong to the same attribute, the control unit 31 may perform a similar process of increasing an ability value for all the pairs, or a process of increasing an ability value for one of the pairs that satisfies a predetermined condition, or a process of increasing an ability value for some of the pairs that satisfy a predetermined condition.

In step S126, the control unit 31 moves a character placed on the fight map according to the user's operation, and control proceeds to the next step. For example, if the control unit 31 determines, by referring to the operation data Dd, that an operation of moving any of the characters on the fight map has been performed, the control unit 31 moves the position of that character according to the operation, and updates the mission process data Dg using the position of the character after the movement. It should be noted that a movement amount, movement speed, and movement allowable place of a character are control based on a movement characteristic of the character in the profile data Da1. In the case where an opposing character is moved under automatic control or a second user's operation received via the server 200, the control unit 31 causes the position of the opposing character to move under automatic control or according to the second user's operation, and updates the mission process data Dg using the position of the opposing character after the movement.

Next, if a fight occurs between any of the characters in the appearance group that is positioned on the fight map and an opposing character, the control unit 31 performs a process of causing the characters to fight against each other (step S127), and ends the subroutine. For example, if the user has performed an operation of attacking the opposing character, the control unit 31 performs a process of causing the character and the opposing character to fight against each other according to the user's operation, and updates the mission process data Dg. If the opposing character attacks any of the characters in the appearance group under automatic control or a second user's operation received through the server 200, the control unit 31 performs a process of causing the opposing character and that character in the appearance group under automatic control or according to the second user's operation, and updates the mission process data Dg. In the fight process, an image showing that the character and the opposing character are fighting against each other is produced, and in addition, the degree of damage or win/loss is determined based on abilities, etc., of the character and the opposing character, ability values are reduced based on the damage, and a character whose HP is zero retreats from the fight map.

In the fight process of step S127, if the character is damaged by the opposing character, an ability value of the character is reduced based on the damage, and the ability data Da2 of the character is updated. If the fight against the opposing character ends, the ability values of all characters in the appearance group are reset to default values (values before the mission), the ability data Da2 of each character is updated. Here, an ability of a character in a fight against an opposing character is set based on the profile data Da1 or ability data Da2 of the character. Therefore, for a recipient character for which the effect reception process has been performed in step S125, any of the ability values indicated by the ability data Da2 has increased, and therefore, the recipient character may have a relative advantage over the opposing character in a fight.

Referring back to FIG. 7, in step S115, the control unit 31 performs a display control process of producing and displaying a display image on a display unit 35, and control proceeds to the next step. For example, during a fight against an opposing character, the control unit 31 performs a process of constructing a virtual world on the fight map, based on parameters (e.g., the mission process data Dg indicating a location and motion of each character, and data indicating a location and orientation of a virtual camera) for producing a fight game image, and displaying an image showing the virtual world on the display unit 35. The control unit 31 also performs a process of producing a display image based on the result of a process in each of the above steps, and displaying the display image on the display unit 35.

Next, the control unit 31 determines whether or not to end the game process (step S116). The game process is ended, for example, under the following condition: a condition for ending the game process is satisfied; a user has performed an operation of ending the game process; etc. If the control unit 31 determines not to end the game process, control returns to step S102, in which the process is repeated. If the control unit 31 determines to end the game process, the process of the flowchart ends.

Thus, according to the information processing system 1 in which the game process is performed, if an attribute of a giver character is the same as an attribute indicated by a gift item possessed by a recipient character, then when an appearance group including the two characters makes a mission in a season belonging to that attribute, an ability of the recipient character increases, and therefore, a setting in the game in which a character in the appearance group fights against an opposing character is changed such that an advantage is given to the user. Here, as described above, a recipient character is selected by the user itself from those possessed by the user. Therefore, in the game in which a portion of a plurality of characters possessed by the user make a mission, the user can take a more variety of strategies.

In the foregoing, the process of acquiring a giver character is accompanied and followed by the process of acquiring a gift item. Therefore, if a user sets the probability of acquiring a giver character to relatively low, the probability of acquiring a gift item is also set to relatively low, and therefore, the rarities of both a giver character and a gift item can be increased. The order in which these processes are performed may be reversed. A predetermined operation by a user may be required between these processes. For example, if, after an event indicating the acquisition of a giver character, a user's operation for proceeding to the next event has been performed, an event indicating the acquisition of a gift item may be performed. As another non-limiting example embodiment, if, after an event indicating the acquisition of a giver character, a user's operation for performing a lottery for acquiring a gift item using a random item offering scheme has been performed, and then a gift item has been acquired by the lottery, an event indicating the acquisition of the gift item by the lottery may be performed. In this case, the acquisition probability may be controlled by the server 200, and an event indicating whether or not a gift item has been successfully acquired is performed based on reception data obtained by data exchange between the information processing apparatus 3 and the server 200. Since the probability of acquisition of a gift item is further reduced, the rarity of a gift item is further increased. It should be noted that a gift item may be acquired at other game events. For example, a lottery for a gift item may be performed using a random item offering scheme at any appropriate timing other than during a fight against an opposing character, and a gift item may be acquired if a user's operation has been performed for the lottery. In this case, the acquisition probability and an attribute of a gift item to be acquired may be controlled by the server 200, and a user is notified of whether or not a gift item has been acquired, based on reception data obtained by data exchange between the information processing apparatus 3 and the server 200, according to a user's operation of performing a lottery for acquisition.

In the foregoing, data is exchanged between the information processing apparatuses 3 through the server 200. As a result, communication between the information processing apparatuses 3 is centrally controlled by the server 200, and therefore, the communication control is easily performed. However, in the case where data may not be centrally held in the server 200, data may be exchanged between the information processing apparatuses 3 or with other apparatuses without through the server 200.

In the foregoing non-limiting example embodiment, an information process and a communication process are performed by the information processing apparatus 3. Alternatively, at least a portion of the above steps in the processes may be performed by another apparatus. For example, steps in the processes may be executed in cooperation with the server 200 or another apparatus (e.g., another server, another game apparatus, another mobile terminal, etc.) that can communicate with the information processing apparatus 3. Thus, processes similar to the above processes can be performed by the server 200 or another apparatus performing a portion of the steps of the process. The above processes may be executed by a single processor or a plurality of cooperating processors included in an information processing system including at least one information processing apparatus. In the above non-limiting example embodiment, the processes shown in the flowcharts are performed by the control unit 31 of the information processing apparatus 3 executing a predetermined program. Alternatively, all or a portion of the above processes may be performed by a dedicated circuit included in the information processing apparatus 3.

Here, according to the above non-limiting variation, this non-limiting example embodiment can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the steps of the above processes may be performed by substantially any of the apparatuses, and this non-limiting example embodiment may be implemented by assigning the steps to the apparatuses in substantially any manner.

The order of steps, setting values, conditions for determination, etc., used in the above information process are merely for illustrative purposes, and other order of steps, setting values, conditions for determination, etc., may be used to implement this non-limiting example embodiment.

The above programs may be supplied to the information processing apparatus 3 not only through an external storage medium, such as an external memory, but also through a wired or wireless communication line. The programs may be previously stored in a non-volatile storage device in the information processing apparatus 3. Examples of an information storage medium storing the programs may include non-volatile memories, and in addition, CD-ROMs, DVDs, optical disc-like storage media similar thereto, and flexible disks, hard disks, magneto-optical disks, and magnetic tapes. The information storage medium storing the programs may be a volatile memory storing the programs. Such a storage medium may be said as a storage medium that can be read by a computer, etc. For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example embodiment and common technical knowledge. It should be understood throughout the present specification that expression of a singular form includes the concept of their plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example embodiment pertains. If there is any inconsistency or conflict, the present specification (including the definitions) shall prevail.

Thus, the non-limiting example embodiment is useful for, for example, an information processing system and information processing method, etc., for allowing a user to take a more variety of strategies in a game in which a plurality of characters appear.

What is claimed is:

1. An information processing system comprising at least one computer, wherein the at least one computer executes:
    selecting at least one character from a plurality of characters possessed by a user according to an input operation;
    adding, to the selected character, an attribute that is related to an additional character;
    executing a game and causing one or more of the plurality of characters possessed by the user to appear in a virtual space during execution of the game;
    determining a value for a time parameter;
    obtaining at least one time dependent attribute based on the value of the time parameter; and
    based one 1) the additional character and the selected character being included in the one or one or more of the plurality of characters that appear in the virtual space and 2) a determination that: a) the obtained at least one time dependent attribute, b) the attribute added to the selected character, and c) an attribute related the additional character are all related to each other, changing a gameplay property in connection with the execution of the game for when the one or more of the plurality of characters appear in the virtual space.

2. The information processing system according to claim 1, wherein the at least one computer further executes:
    setting, according to user operation, an appearance group from among the plurality of characters possessed by the user, the appearance group to appear in the virtual space, and
    wherein the additional character and the selected character are included in the appearance group.

3. The information processing system according to claim 1, wherein
    the attribute is added to the selected character based on giving an item related to the attribute to the selected character, and allowing the item given to the selected character to be used only by the selected character.

4. The information processing system according to claim 1, wherein
    changing the parameter includes an ability setting in the game of the selected character.

5. An information processing system comprising at least one computer, wherein the at least one computer executes:

selecting at least one character from a plurality of characters possessed by a user according to the user's operation;

adding an attribute related to an additional character to the selected character;

causing one or more of the plurality of characters possessed by the user to appear in a game, and executing the game;

setting at least one period of time, wherein the setting includes assigning an attribute related to the additional character to the at least one period of time; and if a) the one or more of the plurality of characters appearing in the game include the additional character and the selected character that has the added attribute, and b) the attribute assigned to the at least one period of time including the current time in the setting the at least one period of time, the attribute added to the selected character having the added attribute, and an attribute related the additional character are all related to each other, then changing a setting in the game.

6. The information processing system according to claim 5, wherein
the at least one computer further executes:
setting one or more of the plurality of characters possessed by the user, as an appearance group, to appear in the game, according to the user's operation, and
the changing the setting in the game includes changing the setting in the game if the characters set as the appearance group include the additional character and the selected character having the added attribute.

7. The information processing system according to claim 5, wherein
the adding the attribute includes adding at least one selected from at least two categories, as the attribute, to the selected character according to the user's operation, and
the changing the setting in the game includes changing the setting in the game if the at least one category indicated by the attribute added to the selected character appearing in the game is the same as at least one category corresponding to an attribute related to the additional character appearing in the game.

8. The information processing system according to claim 5, wherein
the changing the setting in the game includes changing the setting in the game if a current time is within the at least one period of time.

9. The information processing system according to claim 8, wherein
the setting the at least one period of time includes assigning at least one category corresponding to an attribute related to the additional character to the at least one period of time, and
the changing the setting in the game includes changing the setting in the game if the characters appearing in the game include at least one of the additional characters and the selected character having the added attribute, and the at least one category assigned to the at least one period of time including the current time in the setting the at least one period of time, a category indicated by the attribute added to the selected character having the added attribute, and the at least one category corresponding to an attribute related the additional character are the same.

10. The information processing system according to claim 5, wherein
the adding the attribute includes adding the attribute to the selected character by giving an item related to the attribute to the selected character, and allowing the item given to the selected character to be used only by the selected character.

11. The information processing system according to claim 5, wherein the at least one computer further executes:
adding the additional character to the plurality of characters possessed by the user; and
if the additional character is added, adding an item related to the attribute related to the additional character as an item possessed by the user, and
the adding the attribute includes adding the attribute to the selected character by giving an item related to the attribute to the selected character.

12. The information processing system according to claim 5, wherein
the changing the setting in the game includes changing an ability setting in the game of the selected character having the added attribute if the characters appearing in the game include at least one of the additional characters and the selected character having the added attribute, and the attribute added to the selected character having the added attribute corresponds to an attribute related to the additional character.

13. The information processing system according to claim 12, wherein
the changing the setting in the game includes changing the parameter in the game of one or more of the selected character or characters having the added attribute so as to change the ability setting of the selected character having the added attribute if the characters appearing in the game include at least one of the additional characters and the selected character having the added attribute, and the attribute added to the selected character having the added attribute corresponds to an attribute related to the additional character.

14. The information processing system according to claim 13, wherein
the changing the setting in the game includes changing a parameter amount related to the selected character, which is updated in the game, so as to change the ability setting of the selected character having the added attribute if the characters appearing in the game include at least one of the additional characters and the selected character having the added attribute, and the attribute added to the selected character having the added attribute corresponds to an attribute related to the additional character.

15. The information processing system according to claim 12, wherein
the changing the setting in the game includes increasing a parameter in the game of the selected character having the added attribute so as to change the ability setting of the selected character having the added attribute if the characters appearing in the game include at least one of the additional characters and the selected character having the added attribute, and the attribute added to the selected character having the added attribute corresponds to information related to the additional character.

16. The information processing system according to claim 5, wherein
the at least one computer further executes:
moving a location in a display image of the characters appearing in the game according to the user's operation, and the changing the setting in the game includes changing the setting in the game based on a positional relationship between the characters displayed in the display image, and changing the setting in the game, separately from the changing the setting in the game based on the positional relationship, if the characters appearing in the game include at least one of the additional characters and the selected character having the added attribute, and the attribute added to the selected character having the added attribute corresponds to an attribute related to the additional character.

17. The information processing system according to claim 5, wherein
the selecting the at least one character includes selecting a character other than the additional character from the plurality of characters possessed by the user, as the at least one selected character.

18. The information processing system according to claim 5, wherein
the adding the attribute further includes, if the selected character have an already added attribute, deleting the already added attribute from the selected character, and adding an attribute related to the additional character to the selected character.

19. An information processing method comprising:
selecting, based on an operation input, a first character from a plurality of characters of a video game;
adding, to the first character, an attribute related to a second character;
as part of executing the video game, causing a group of the plurality of characters of the video game to appear within a virtual space;
setting at least one value for a time parameter, wherein the setting includes assigning the attribute related to the second character;
obtaining at least one time dependent attribute, wherein at the at least one time dependent attribute includes an attribute that is related to the second character; and
changing at least one setting in the video game based on:
1) determination that both the first and second characters are included in the group that is set to appear within the virtual space, and
2) determination that the obtained at least one time dependent attribute, the attribute added to the first character, and an attribute related the second character are all related to each other.

* * * * *